United States Patent
Goldman et al.

(10) Patent No.: US 7,130,384 B2
(45) Date of Patent: Oct. 31, 2006

(54) END USER DEVICE SUPPORTED EMERGENCY 9-1-1 FUNCTION

(75) Inventors: Stuart Owen Goldman, Scottsdale, AZ (US); Douglas Harold Rollender, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/094,735

(22) Filed: Mar. 30, 2005

(65) Prior Publication Data

US 2006/0222151 A1 Oct. 5, 2006

(51) Int. Cl.
*H04M 11/00* (2006.01)
(52) U.S. Cl. .......................................... 379/37; 379/40
(58) Field of Classification Search ............ 379/37–45; 340/539, 531
See application file for complete search history.

(56) References Cited

U.S. PATENT DOCUMENTS

| | | | | |
|---|---|---|---|---|
| 5,933,080 A | * | 8/1999 | Nojima | 379/37 |
| 6,671,350 B1 | * | 12/2003 | Oxley | 379/45 |
| 6,807,564 B1 | * | 10/2004 | Zellner et al. | 379/37 |

* cited by examiner

*Primary Examiner*—Stella Woo

(57) ABSTRACT

A method is provided for conducting an emergency communication session with public safety answering point (54) over a public switched telephone network (50). The method includes: storing in a device (60) used to initiate the emergency communication session, a current location of the device (60); initiating the emergency communication session responsive to a selection of a function supported by the device (60); establishing the emergency communication session between the device (60) and the public safety answering point (54) over the public switched telephone network (50); and, transmitting the stored location from the device (60) to the public safety answering point (54).

14 Claims, 1 Drawing Sheet

US 7,130,384 B2

END USER DEVICE SUPPORTED EMERGENCY 9-1-1 FUNCTION

FIELD

The present inventive subject matter relates to the telecommunication arts. Particular application is found in conjunction with emergency telecommunication services (e.g., emergency 9-1-1 calls), and the specification makes particular reference thereto. However, it is to be appreciated that aspects of the present inventive subject matter are also amenable to other applications.

BACKGROUND

With reference to FIG. 1, as is known in the art, the Public Switched Telephone Network (PSTN) 10 includes mechanisms for directing certain calls, such as an emergency 9-1-1 call, to a Public Safety Answering Point (PSAP) 20. For example, consider an end office (EO) 30 serving a wireline or landline end user device (EUD) 40 (e.g., a telephone) from which a 9-1-1 call is placed. The EO 30 commonly includes a telecommunications switch 32 (e.g., a class 5 switch such as the Lucent Technologies 5ESS or another like switch) that is operatively connected, e.g., via a twisted-pair line or cable, to the EUD 40. When the switch 32 recognizes a 9-1-1 call, the call is routed, e.g., over the PSTN 10, to the PSAP 20 serving the geographic region in which the EUD 40 is located.

Typically, upon receiving a 9-1-1 call, the PSAP 20 queries an Automatic Line Identification (ALI) database (DB) using the telephone or directory number of the calling EUD 40. The ALI DB provides the PSAP 20 with information associated with the calling EUD 40, e.g., the geographic and/or physical location of the EUD 40 (i.e., a street address or other positional identification). In this manner, a proper response to the 9-1-1 call can be quickly and readily dispatched to the proper location or otherwise coordinated.

While generally acceptable for the landline EUD 40, advances in the telecommunications field have given rise to many situations where the foregoing approach has certain limitations. For example, there are now a wide variety of different types of EUDs employed by various end users or subscribers to engage in communications. These different EUDs have different capabilities and different characteristics. For example, mobile telephones and other mobile EUDs are different from landline telephones and EUDs insomuch as their location is generally not fixed like the landline EUDs. Accordingly, the PSAP 20 may not be able to readily determine the location of a mobile EUD simply from its telephone number. Additionally, packet switched networks (such as the Internet or a managed private network) are being used to route voice telephone calls. Generally, this is known as voice-over-packet telephony, which includes, but is not limited to, VoIP (Voice over Internet Protocol). One of the advantages of voice-over-packet telephony is the ability for users to access the PSTN 10 through a telecommunications switch other than their current local switch. Various types of EUDs are available for end users to participate in voice-over-packet telephony, e.g., an IP telephone, which may be a hardphone or a softphone running on a laptop computer or other like platform. Furthermore, various EUDs may be equipped to communicate using a variety of different modes and/or telecommunication services. For example, common EUDs (e.g., landline telephones, desktop or laptop computers, personal digital assistants (PDAs), mobile telephones or mobile stations, etc.) may support any one or more of a voice-based service, text messaging, instant messaging, short message service (SMS), electronic mail (e-mail), etc.

In short, the various EUDs now in use have a range of differing portability and a range of different communication modes. For example, the EUD may have limited portability, such a desktop computer that may be moved from location to location and reconnected to a local area network (LAN), or it may have may limited mobility, such as a handheld terminal with in-building or on-campus access to a WiFi access point. Alternately, the EUD may have extensive mobility and be connected by wireless access to the public cellular or wireless network. The common element is that there is no fixed, permanent location associated with the EUDs as had been the case with traditional wireline or landline EUDs, and there are now a plurality of optional communication modes available to the EUDs. Nevertheless, it remains desirable to permit users of these various types of EUDs and various services to take advantage of the emergency calling network infrastructure already in place, i.e., the PSAPs and the 9-1-1 emergency calling feature.

Accordingly, a new and improved function supported on an end user telecommunications device for handling emergency calls is disclosed that overcomes the above-referenced problems and others.

SUMMARY

In accordance with one embodiment, a method is provided for conducting an emergency communication session with public safety answering point over a public switched telephone network. The method includes: storing in a device used to initiate the emergency communication session, a current location of the device; initiating the emergency communication session responsive to a selection of a function supported by the device; establishing the emergency communication session between the device and the public safety answering point over the public switched telephone network; and, transmitting the stored location from the device to the public safety answering point.

In accordance with another embodiment, an end user telecommunication device includes: location storing means for storing in the device a current location of the device; initiation means for initiating an emergency communication session responsive to a selection of a function supported by the device such that the emergency communication session is established between the device and a public safety answering point over a public switched telephone network; and, transmission means for transmitting the stored location from the device to the public safety answering point.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components and features that are commonly known in the telecommunications art without further detailed explanation as to their configuration or operation except to the extent they have been modified or altered in accordance with and/or to accommodate the preferred embodiment(s) presented herein.

Figure 1:
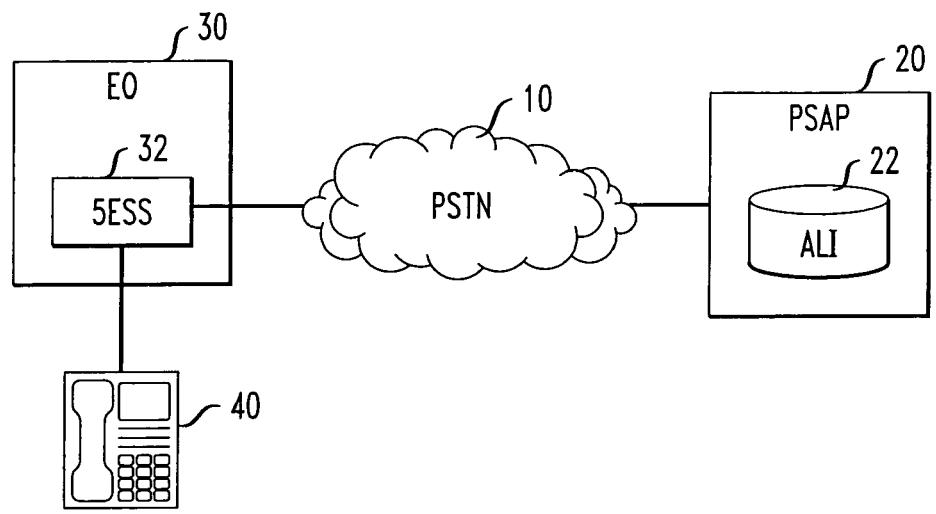
FIG. 1 is a block diagram illustrating an example of a conventional telecommunications network for handling 9-1-1 calls.
Figure 2:
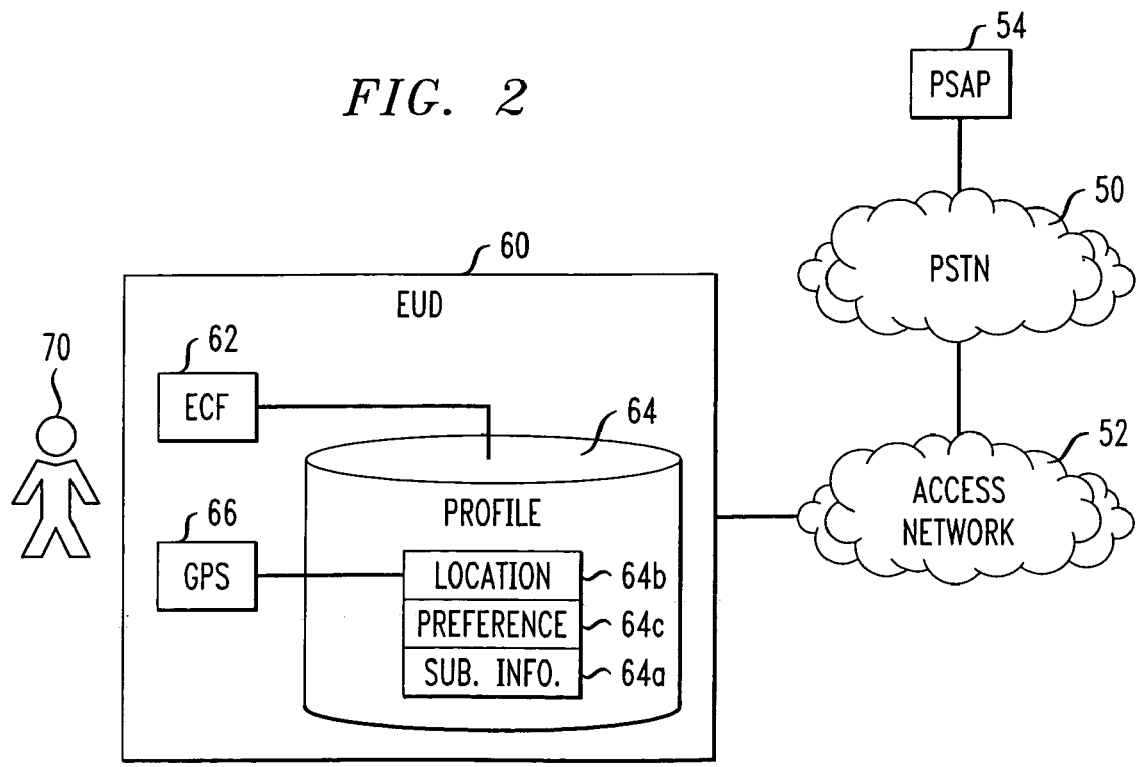
FIG. 2 is a block diagram illustrating an exemplary telecommunications network and end user device suitable for practicing aspects of the present inventive subject matter.

With reference to FIG. 2, there is illustrated a telecommunications network including a PSTN 50 and an optional access network 52. Suitably, the access network 52 may be a wireless or cellular network, an IP or packet-switched network, a LAN, etc., operatively interconnected with the PSTN 50 in the usual manner to provide access to and/or communication with and/or over the PSTN 50. As shown, a PSAP 54 is operatively connected to the PSTN 50 in the usual manner to receive 9-1-1 or other like emergency calls.

A telecommunications EUD 60 is selectively used by an end user 70 to access the PSTN 50 via the optional access network 52, for example, to communicate across the same. The EUD 60 operatively connects with the access network 52 in the usual manner, e.g., via a LAN, a wireless interface, a WiFi access point, etc., depending upon the particular EUD 60 being used by the subscriber 70. Suitably, the EUD 60 is a mobile or wireless EUD 60, but may be a landline or wireline based EUD 60. The EUD 60 is optionally a computer, e.g., a desktop or laptop computer, a PDA, a mobile telephone or other mobile station, a landline telephone, etc. The EUD 60 is optionally an IP or packet-switch based device, e.g., an IP-based hardphone or a softphone running on a computer or other like platform. Alternately, the EUD 60 is a circuit-switch based device. In still another embodiment, the EUD 60 may support both packet and circuit-switched communication protocols. The EUD 60 optionally supports a plurality of communication modes, including, e.g., one or more of the following modes: voice communications, SMS, instant messaging, e-mail, text messaging, etc. Suitably, in the case of a wireline or landline based EUD 60, the EUD 60 may be connected directly to the PSTN 50, e.g., via a twist-pair cable or line operatively connected to a node of the PSTN 50, such as an end office's telecommunications switch.

As is known in the art for different types of EUDs, the EUD 60 optionally includes a variety of input and/or output devices through which the subscriber 70 interfaces with the EUD 60. For example, the EUD 60 optionally, includes a display, a touch screen, a keyboard or keypad, a number of soft and/or hard buttons or keys, a mouse or other pointing device, a speaker, a microphone, etc. The EUD 60 also includes a memory, and a central processing unit (CPU) that regulates its operation. Additionally, the EUD 60 optionally includes one or more storage devices, such as a hard disk drive, a magnetic floppy disk drive, an optical disk drive, etc.

The EUD 60 is provisioned with an emergency calling feature or function (ECF). The ECF is optionally invoked in by dialing a selected number, e.g., 9-1-1. Suitably, however, the EUD 60 is also provisioned with an activation button or key 62 that the subscriber 70 employees to selectively invoke the ECF. The activation button or key 62 is optionally a hard button or alternately a soft button programmed to invoke the ECF. Alternately, the ECF may be selected by the subscriber 70 from a pull-down menu or other like directory or list presented on the EUD's display. Invoking the emergency calling feature or function generates a call or message from the EUD 60 which is directed over the PSTN 50 in the usual manner to the PSAP 54.

In a suitable embodiment, a profile 64 for the subscriber 70 and/or EUD 60 is maintained in a database or memory resident on or in the EUD 60. Information maintained in the profile 64 may optionally be entered or obtained via a number of different mechanisms depending on the form of the EUD 60, e.g., the information may be downloaded from a computer, obtained via a subscriber identity module (SIM) card, etc. Suitably, the profile 64 includes a variety of subscriber information, e.g., maintained in a subscriber information record 64a. The subscriber information record 64a may include, e.g., the subscriber's home address and/or home telephone number, an emergency contact number, a list of medical conditions and/or prescriptions, other medical information and/or records, such as a sample electrocardiogram (ECG), etc.

Additionally, the profile 64 also contains the current location information for the EUD 60, e.g., in a location record 64b, which is updated periodically. As shown, the EUD 60 is equipped with a global positioning system (GPS) 66 such that it is self-aware of its current location. Accordingly, the location determined by the GPS 66 is used to periodically update the location maintained in the current location record 64b of the profile 64. Alternately, if the EUD 60 is not self-aware of its location, any one or more of a number of other mechanisms are optionally employed to obtain this information. For example, for a wireless or mobile EUD 60, the wireless access network 52 may in a known manner triangulate the EUD's position and transmit this position back to the EUD 60. Alternately, for an EUD 60 connected to a LAN, the connection point may be used to derive the corresponding physical location of the EUD 60. In still another case, if the connection is by WiFi, the coordinates associated with the WiFi hot spot may provide the location information. Suitably, when the EUD 60 first registers on or with the access network 52 and/or the PSTN 50, the location of the EUD 60 is determined, e.g., through an exchange of messages, signaling or otherwise.

Suitably, the profile 64 also includes a connection or communication mode preference, e.g., maintained in a preference record 64c. The preference record 64c is consulted to determine the communication mode preference of the subscriber 70 for making 9-1-1 or other similar emergency calls. Suitably, when the EUD 60 supports a plurality of communication modes, the preference record 64c includes a list of those communication modes in the order preferred by the subscriber 70 for making 9-1-1 or other similar emergency calls. For example, if the EUD 60 were a mobile or wireless telephone supporting voice, SMS and e-mail communication modes. The record 64c may include one or more of the three listed in the order preferred by the subscriber 70. Optionally, included along with each mode in the preference record 64c, is any routing and/or connection information that may be appropriate for aiding routing and/or connecting the call and/or message with the PSAP 54.

When the ECF is invoked, the EUD 60 determines if the first listed communication mode in the preference record 64c is possible at the particular point in time, i.e., if the serving system or appropriate access network is available. If the first preferred mode is available, a communication session is set up with the access network 52 or otherwise as appropriate to reach the PSAP 54 with a call or message, if not next preferred mode in the ordered list is attempted. This process continues until all the listed modes have been tried. In the situation where the end of the ordered list has been reached without success, the EUD 60 will loop back through the list again until a successful connection is made with the PSAP 54 or until the subscriber 70 manually ends the ECF. Alternatively, a menu of supported or available communication modes could be displayed for the subscriber 70 to select from at the time the ECF is invoked. However, since it is likely an emergency situation, if no preference is selected, e.g., before a timer expires, the default ordered list from the preference record 64*c* would be used.

Once a connection and/or communication session has been established with the PSAP 54, the EUD 60 optionally transmits one or more of the profile records or selected information therein to the PSAP 54, either automatically or upon request from the PSAP 54. Significantly, for a mobile or otherwise non-fix location EUD 60, the PSAP 54 optionally obtains the current location information from the location record 64*b*. Similarly, the PSAP 54 may receive pertinent medical information about the subscriber 70 from the subscriber information record 64*a*, which can then be conveyed to any dispatched medical professionals that would be responding to the call.

Depending upon the communication mode or connection type ultimately established, the subscriber 70 is also able to communicate with the PSAP 54. For example, if a voice mode is used, the subscriber 70 may speak with the PSAP operator in the usual manner. If a text-based mode was established, the subscriber 70 may optionally send a contemporaneously drafted or a pre-stored text massage, e.g., "send an ambulance" or the like, or the subscriber 70 may optionally enter into an exchange of messages with the PSAP operator about the nature of the emergency. Suitably, if the EUD 60 where, e.g., a mobile or wireless cameraphone or other multimedia device, the subscriber 70 may optionally send a picture or video of the emergency scene to the PSAP 54.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for conducting an emergency communication session with a public safety answering point over a public switched telephone network, said method comprising:
    (a) storing in a device used to initiate the emergency communication session, a current location of the device, said device supporting a plurality of communication modes;
    (b) storing a list of the communication modes supported by the device in an order of preference;
    (c) successively, in accordance with the order of preference, determining if one of the listed communication modes is available for establishing the emergency communication session;
    (d) upon detecting an available communication mode, establishing the emergency communication session between the device and the public safety answering point over the public switched telephone network using the available communication mode; and,
    (e) transmitting the stored location from the device to the public safety answering point.

2. The method of claim 1, wherein the supported communication modes include at least two of voice, short message service, text messaging, instant messaging and electronic mail communications.

3. The method of claim 1, further comprising:
    obtaining the location stored in step (a) from a global positioned system.

4. The method of claim 1, further comprising:
    providing a button on the device which is used to select the function that initiates the emergency communication session.

5. The method of claim 4, wherein the button is a soft button programmed to invoke the function.

6. The method of claim 1, further comprising:
    storing personal information about the user of the device on the device; and,
    transmitting the personal information about the user of the device to the public safety answering point after the communication session has been established.

7. The method of claim 6, wherein the personal information includes medical information.

8. An end user telecommunication device comprising:
    location storing means for storing in the device a current location of the device;
    preference storing means for storing a list of communication modes supported by the device in an order of preference;
    initiation means for initiating an emergency communication session responsive to a selection of a function supported by the device such that the emergency communication session is established between the device and a public safety answering point over a public switched telephone network;
    determining means for determining, successively, in accordance with the order of preference, if one of the listed communication modes is available for establishing the emergency communication session, such that upon detecting an available communication mode, the available communication mode is used to establish the communication session with the public safety answering point; and, transmission means for transmitting the stored location from the device to the public safety answering point.

9. The device of claim 8, wherein the supported communication modes include at least two of the following: voice, short message service, text messaging, instant messaging and electronic mail communications.

10. The device of claim 8, further comprising:
a global positioned system that supplies the location to the location storing means.

11. The device of claim 8, further comprising:
a button on the device which is used to select the function that initiates the emergency communication session.

12. The device of claim 11, wherein the button is a soft button programmed to invoke the function.

13. The device of claim 8, further comprising:
personal information storing means for storing personal information about the user of the device on the device, said personal information about the user of the device being transmitted to the public safety answering point after the communication session has been established.

14. The device of claim 13, wherein the personal information includes medical information.

\* \* \* \* \*